United States Patent [19]

Wooten

[11] Patent Number: 5,568,621
[45] Date of Patent: Oct. 22, 1996

[54] CACHED SUBTRACTIVE DECODE ADDRESSING ON A COMPUTER BUS

[75] Inventor: David R. Wooten, Spring, Tex.

[73] Assignee: Compaq Computer Corporation, Houston, Tex.

[21] Appl. No.: 150,228

[22] Filed: Nov. 10, 1993

[51] Int. Cl.[6] ........................................ G06F 12/02
[52] U.S. Cl. .................. 395/292; 395/298; 370/85.13
[58] Field of Search ................................ 395/325, 400, 395/292, 298; 370/85.13

[56] References Cited

U.S. PATENT DOCUMENTS

| 4,597,078 | 6/1986 | Kempf | 370/94 |
| 4,635,192 | 1/1987 | Ceccon et al. | 361/415 |
| 4,882,709 | 11/1989 | Wyland | 365/189.02 |
| 4,922,503 | 5/1990 | Leone | 370/85.13 |
| 5,157,774 | 10/1992 | Culley | 395/425 |
| 5,210,850 | 5/1993 | Kelly et al. | 395/425 |
| 5,226,150 | 7/1993 | Callander et al. | 395/575 |
| 5,245,606 | 9/1993 | DeSouza | 370/85.13 |
| 5,287,482 | 2/1994 | Arimilli et al. | 395/425 |
| 5,293,495 | 3/1994 | Nguyen et al. | 395/325 |
| 5,325,504 | 6/1994 | Tipley et al. | 395/425 |
| 5,379,384 | 1/1995 | Solomon | 395/325 |

OTHER PUBLICATIONS

Peripheral Component Interconnect (PCI), Revision 1.0 Specification, PCI Special Interest Group (Jun. 22, 1992).
Changes to PCI Specification, Rev. 1.0, Part 2, Preliminary, PCI Special Interest Group (1992).

Primary Examiner—Jack B. Harvey
Assistant Examiner—Paul R. Myers
Attorney, Agent, or Firm—Pravel, Hewitt, Kimball & Krieger

[57] ABSTRACT

A local bus subtractive decode device that improves the speed of its subtractive decoding by storing or caching subtractively decoded addresses. At the start of subsequent address cycles, this cached subtractive decode device compares the address and command on the local bus with the stored addresses and commands, and if it finds a match, claims the transaction as would a positive decode device. It can do so without conflict because no positive decode device will be claiming the transaction.

14 Claims, 5 Drawing Sheets

CACHED SUBTRACTIVE DECODE ADDRESSING ON A COMPUTER BUS

BACKGROUND OF THE INVENTION

1. Field of the Invention

This invention relates to computer busing systems, and more particularly to a method of and apparatus for improving performance of a device addressed through subtractive decoding.

2. Description of the Related Art

The personal computer industry is an incredibly dynamic and innovative field. Advancements in speed and power tend to be revolutionary rather than evolutionary, and one day's state-of-the-art is the next day's obsolescence. In the early 1980's, an Intel Corporation 8080 microprocessor running at 4 MHz, was considered leading edge; today, that same company's 80486 running at 66 MHz offers hundreds of times the processing power and yet costs no more than that 8080 system.

But the advances in performance and speed have brought attendant problems. One such problem is associated with the bandwidth of the data pathways within the systems using these incredibly fast processors. When a system's processor ran at 4 Mhz transferring data between the processor, memory, and I/O storage subsystems placed few demands on the system data bus, even when that bus was only eight bits, or one byte, wide. With processor clock speeds approaching 100 MHz, even when using 32- and even 642 -bit wide data paths these once lightly traveled buses can approach gridlock.

Thus, microcomputer system designers have sought and developed more sophisticated buses to handle the transfer of these massive amounts of data. With high speed 24-bit color graphics, lightning fast hard disk drives, and multi-megabyte memory configurations, developers have recently turned their attention to adding intermediate buses known as local buses to systems.

In a typical computer system, the processor has a processor bus connected to memory and possibly to a cache subsystem. That processor bus then interfaces with an expansion bus, such as an Extended Industry Standard Architecture (EISA), Industry Standard Architecture (ISA), or Micro Channel bus. In such a system, however, the high processor speeds can be rendered virtually worthless as the system performance is often limited by the speed of the slowest I/O device or by the speed at which the processor can receive and transmit data to and from that device.

To improve data flow and to better utilize the high clock rates of the newer processors, developers turned to the local bus. A local bus resides logically between the processor bus and the expansion bus, connecting to those buses through bridge circuitry. A number of standards have been developed, including VESA's (Video Equipment Standard Association) VL-Bus, Intel Corporation's PCI (Peripheral Component Interconnect), and Apple Computer Company's QuickRing. FIG. 1 shows the typical layout of a PCI based computer system. As can be seen, a processor-cache-memory subsystem, which typically uses a processor bus, connects through a bridge to PCI. Also connected to PCI are audio and video, graphics, I/O, SCSI, and LAN subsystems. Further, an expansion bus chip set forms the bridge circuitry connecting PCI to the standard expansion bus, such as an EISA bus.

In discussing PCI, a few conventions will be observed. A signal name in all capital letters indicates a defined bus signal. For example, CLK and AD[31..00] respectively represent the PCI clock signal and the 32 PCI address-data signals. These signals are physically asserted active high, and their logical negation is indicated by being preceded with an exclamation point (!). For example, when the CLK line is low, and thus CLK is false, !CLK is true. Signals internal to the device according to the invention will be indicated by capitalizing the first letter.

The PCI specification defines some signals as active low following the special signal type definitions of PCI. These signals' physical lines are indicated in their negated state by being followed by a pound (#) sign. For example, when the physical FRAME# and DEVSEL# lines go low, that represents respectively the start of a frame and a device select. The corresponding logical signals are indicated by dropping the pound (#) sign. Thus, when the FRAME# line is physically low, then the logical signal FRAME is true and the logical signal FRAME is false; that is, the PCI bus is currently in a frame, or transaction. Similarly, when the physical DEVSEL# line is low, the logical signal DEVSEL is true and !DEVSEL is false.

These conventions are consistent with the description of PCI found in the Peripheral Component Interconnect (PCI) Revision 1.0 Specification, Jun. 22, 1992, ©1992 INTEL Corp., and the Nov. 6, 1992, Preliminary Draft Addendum, ©1992 PCI Special Interest Group, both of which are incorporated by reference.

Certain lines and signals are provided by the PCI bus that are used in a device according to the invention. The CLK line provides timing for all transactions on PCI and is an input to every PCI device. All other PCI signals are sampled on the rising edge of CLK, and all other timing parameters are defined with respect to this signal's edge. The PCI address and data signals are multiplexed onto the same lines, AD[31..00]. During the first clock of a transaction, AD[31..00] contain a physical byte address (32 bits); it is this address that is of importance to the device according to the invention. During subsequent clocks, AD[31..00] contain data. Bus commands and byte enables are also multiplexed upon the same lines, C/BE#[3..0]. During the address phase of a transaction, C/BE#[3..0] define the bus command, and during a subsequent data phase they carry byte enables. These bus commands are also of importance to a device constructed according to the invention. A cycle frame signal, FRAME#, is driven by the current bus master to indicate the beginning and duration of an access. FRAME# is asserted to indicate a bus transaction is beginning. While FRAME# is asserted, data transfers continue; when FRAME# is deasserted, the transaction is in the final data phase. The device select signal, DEVSEL#, when actively driven, indicates the driving device has decoded its address as the target of the current access. As an input, DEVSEL# indicates whether any device on the bus has been selected.

FIG. 2 generally illustrates the timing of a PCI addressing. Addressing and device selection on PCI is generally performed through a technique known as positive decoding. The current bus master places an address on the address lines AD[31..00] and a control word on the bus command lines C/BE#[3..0] and then asserts the FRAME# line low (FRAME true) to indicate the start of a transaction. Each device then examines the address and bus command lines and determines if the currently asserted address and bus command select that device. If so, the device claims the transaction by asserting the DEVSEL# line low to acknowledge that it is the selected device. This can be done within one, two, or three clock cycles after the bus master asserts the FRAME# line active low to indicate the start of transaction.

As is also apparent in FIG. 2, PCI performs addressing synchronously with the rising edge of the clock signal CLK. It is on the rising edge that the various signals are sampled. When speaking of signal states and signal transitions with respect to PCI, the terms "asserted" and "deasserted" will refer to the state of the signal on the clock edge, and not to signal transitions. This means that the phrase "signal 'x' is asserted on clock 'y'" is a shortened equivalence for the phrase "signal 'x' is driven such that it will be sampled in the asserted state by all bus agents on clock 'y'". Further, a signal is considered asserted when it is true. Thus, DEVSEL# is asserted when it is physically low; in such a case, DEVSEL is true.

Under the PCI standard, one PCI device is allowed to use an alternate form of addressing decoding known as subtractive decoding. The subtractive decode device does not positively decode an address, but instead determines whether no other PCI device has positively decoded the address. If no other device asserts DEVSEL# active low within three clock cycles of the start of a frame, then the subtractive decode device claims the transaction by asserting DEVSEL# low (DEVSEL true).

Typically, an expansion bus bridge is the subtractive decode device, as addresses on the expansion bus are usually fragmented. Further, the system usually does not know beforehand which devices at which I/O addresses will be located on the standard expansion bus. Thus, the expansion bus chip set is made the subtractive decode device, as any "unanswered" address will default to that chip set.

But as can be seen from FIG. 2, this entails a delay of three clock cycles for every expansion bus access. Thus, every time the expansion bus chip set is addressed through subtractive decoding, three extra clock cycles are added to the access. This follows from the need to allow positive decode devices to exercise a "first right of refusal" on the access. Because these extra cycles are required on each access, this could rapidly add up to a large overhead.

Thus, it would be desirable to increase the speed of subtractive decode addressing by eliminating these extra clock cycles.

SUMMARY OF THE INVENTION

A local bus subtractive decode device constructed according to the invention improves the speed of subtractive decode addressing by caching the address of a subtractively decoded transaction. The next time a bus master asserts that address at the start of a transaction, the address cache indicates a "hit" and causes the subtractive decode device according to the invention to immediately claim the transaction. Thus, by caching previously subtractively decoded addresses, the subtractive decode device according to the invention effectively performs positive decoding of the cached addresses. This eliminates the delay associated with the "first right of refusal" that must normally be accorded positive decode devices.

The address cache used to hold the subtractively decoded addresses can have any arbitrary number of entries and can use any of a number of well known replacement algorithms, where the replacement algorithm simply determines which previous entry should be replaced by a new entry. A single entry address cache, which could be a register and a comparator, usually results in the greatest marginal performance increase, but each additional entry then incrementally increases performance.

If, for example, a bus mater on PCI attempts to read a block of data from the standard expansion bus, the first read requires three extra cycles, as the expansion bus chip set, which is usually the subtractive decode device, must accord all other devices a "first right of refusal" to the transaction. On subsequent reads, however, that address will have been stored in the address cache of the device according to the invention, so the expansion bus chip set will effectively positively decode the address and will immediately assert the device select line, DEVSEL#, preferably as a fast device, thus saving three clock cycles on all subsequent accesses.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
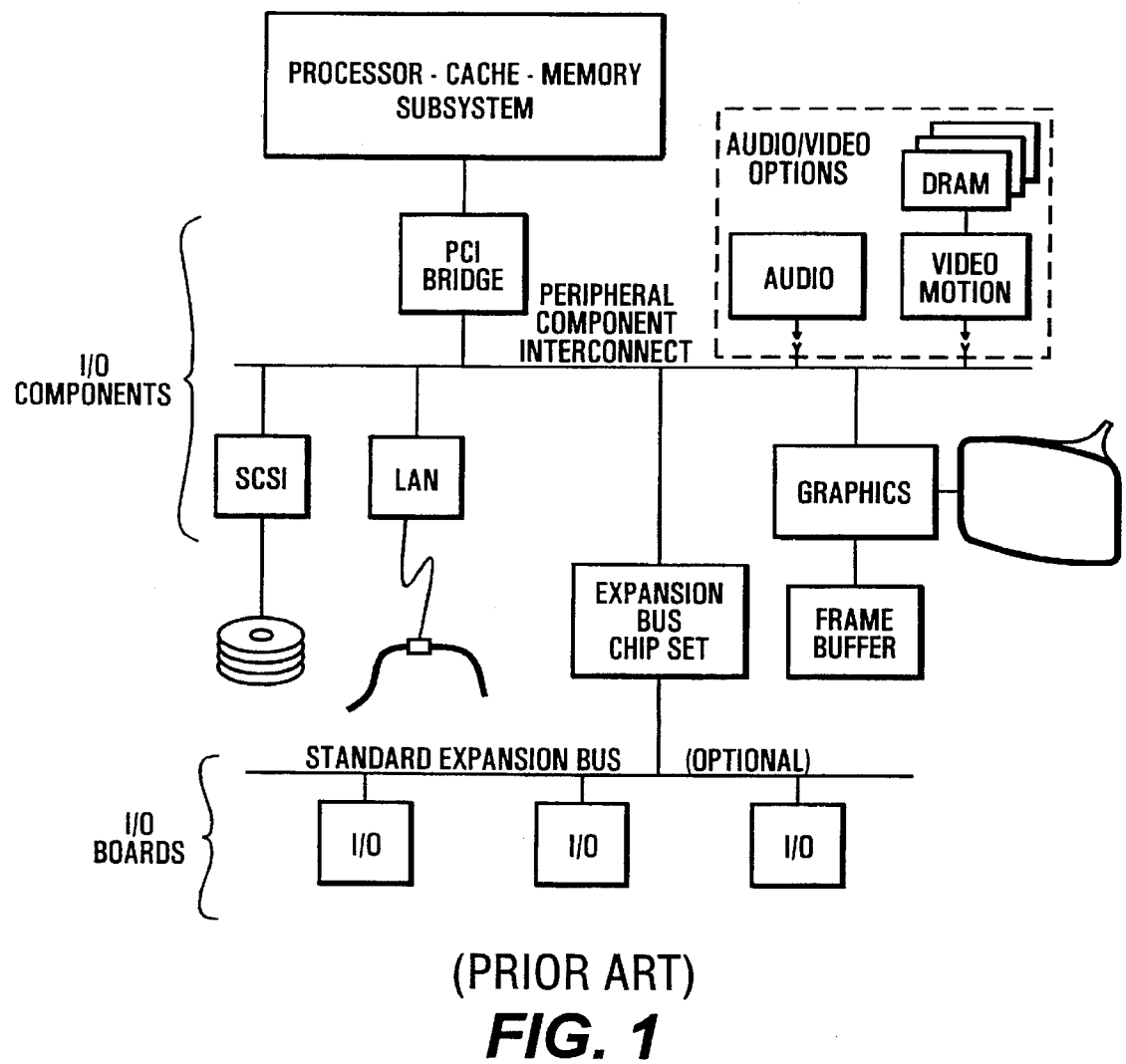
FIG. 1 shows a block diagram of a prior art computer system including a processor subsystem, a standard expansion bus, and a Peripheral Component Interconnect (PCI) local bus.
Figure 3:
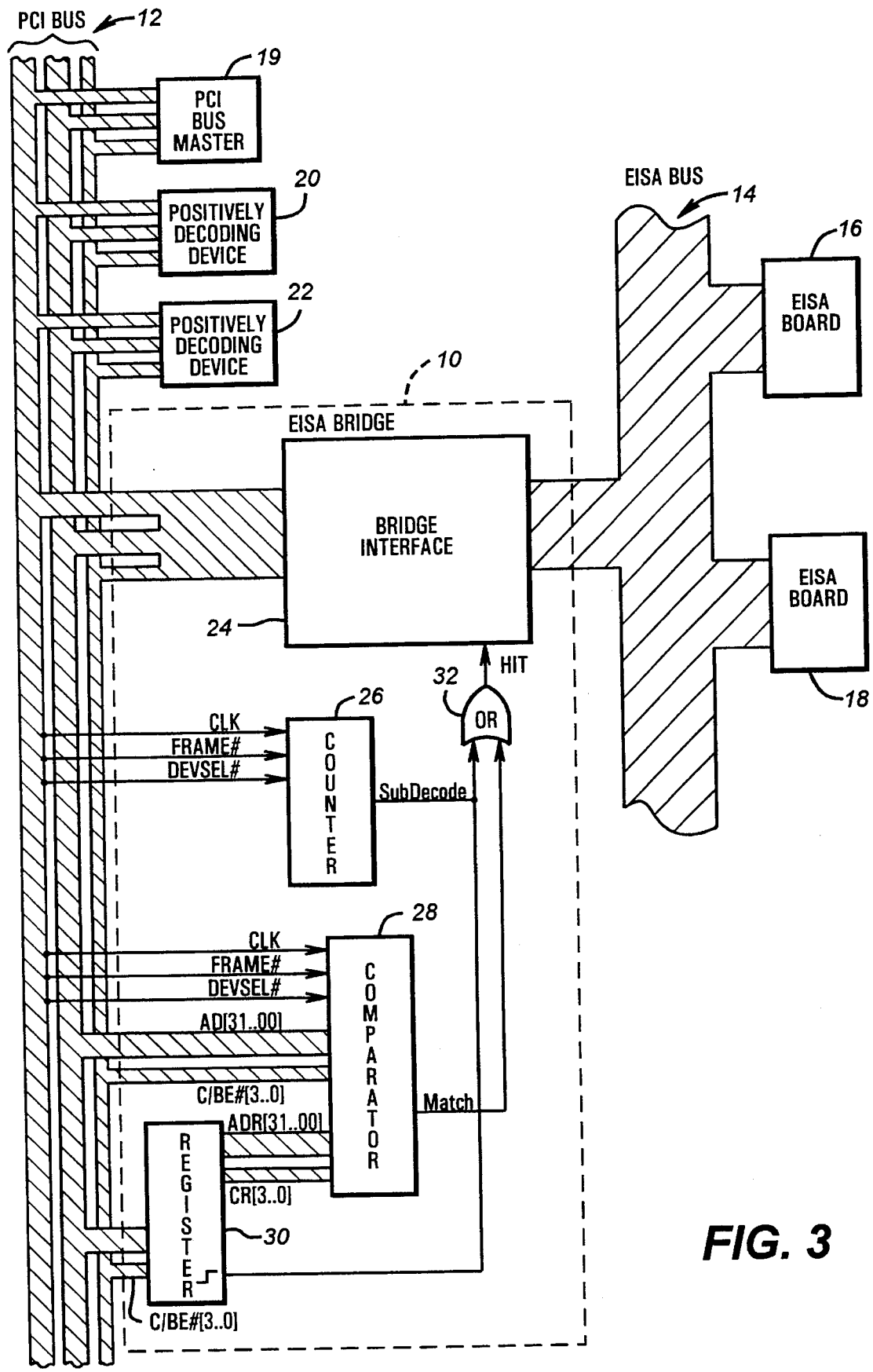
FIG. 3 shows a subtractive decode device constructed according to the invention that stores a single address and command combination for positive decoding on similarly addressed subsequent transactions.

Turning now to the drawings, FIG. 3 shows an EISA bridge 10 constructed according to the invention. The EISA bridge 10 is of course illustrative only, and the invention could just as well be practiced with any subtractive decode device on a system with a bus that provides for subtractive decoding. This EISA bridge 10, as in the prior art as shown in FIG. 1, interfaces a PCI bus 12 to an EISA bus 14, allowing EISA boards 16 and 18 to communicate with a PCI bus master 19 over the PCI bus 12. The PCI bus 12 is further connected to exemplary PCI positive decode devices 20 and 22 and to the PCI bus master 19. Similarly, the EISA bus 14 connects to the exemplary EISA boards 16 and 18.

In the prior art, the EISA bridge 10 would generally have been a typical subtractive decode device. That is, a prior art EISA bridge would only claim a transaction by asserting the device select line DEVSEL# low if no other PCI device had asserted it in the first three clocks following the PCI bus master 19 indicating the start of a transaction by asserting FRAME# low. Thus, under the PCI specification, a prior art EISA bridge would require three extra clock cycles before asserting DEVSEL# low. This, of course, is normal in subtractive decoding, as PCI positive decode devices 20 and 22 must be accorded the "first right of refusal."

The EISA bridge 10 according to the invention, however, takes advantage of the static nature of memory and I/O addresses; that is, those addresses do not usually change after system initialization. By "remembering" that an address was previously subtractively decoded, the EISA bridge 10 according to the invention can skip the "first right of refusal" period when it recognizes the previously subtractively decoded address. Instead, as with a positive decode device, the EISA bridge 10 immediately asserts DEVSEL# low on such an address.

On those rare occasions that the I/O addresses in the EISA bridge 10 do change after initialization, any previously stored subtractively decoded addresses are flushed. This flush is performed essentially as would be a typical cache flush using circuitry, signals, and techniques well known in computer system design.

In the EISA bridge 10 according to the invention, the EISA bridge 10 includes a bridge interface 24 and a counter 26. The bridge interface 24 and the counter 26 would be typical of a standard subtractive decode PCI device, as will be described below. In addition, however, the EISA bridge 10 includes a comparator 28 and a register 30. The comparator 28 and the register 30 allow the EISA bridge 10 to save a previously subtractively decoded address and to immediately assert the DEVSEL# line through positive decoding when that subtractively decoded address is again asserted by the PCI bus master 19.

The EISA bridge 10 can be a group of discrete devices that have signals suitable for interfacing with both the EISA bus 14 and the PCI bus 12, but would preferably be a single integrated device. If a single device, the EISA bridge 10 would include the bridge interface 24, the counter 26, the comparator 28, the register 30, and an OR gate 32 as logical blocks within the integrated circuit rather than as physically separate devices.

The counter 26 uses as its inputs the PCI bus 12 signals CLK, FRAME#, and DEVSEL#. As an output, it supplies a signal SubDecode. In a prior art subtractive decode device, the SubDecode line from the counter 26 would be directly supplied as a Hit signal to the bridge interface 24.

The counter 26 and the SubDecode signal operate as they would in a typical subtractive decode device. That is, when FRAME is true, counter 26 begins counting each positive transition of CLK. If three clock cycles pass without DEVSEL going true, then no PCI positive decode device 20 or 22 has claimed the PCI transaction. Thus, subtractive decode is appropriate, and the counter 26 asserts SubDecode true; that signal would then drive the bridge interface 24 as the Hit signal. The bridge interface 24 would then assert the DEVSEL# line low, and would hold that signal asserted, or low, until the end of the current frame.

In the EISA bridge 10 according to the invention, however, a Match signal, along with SubDecode, is supplied as the input to the OR gate 32. Match is generated by the comparator 28, which uses as inputs CLK, FRAME#, DEVSEL#, AD[31..0], C/BE#[3..0], ADR[31..0], and CR[3..0]. These last two sets of signals, ADR[31..0] and CR[3..0], reflect previously stored contents of the address lines AD[31..0] and the command lines C/BE#[3..0] and are provided by a register 30. That register 30 uses as inputs the address lines AD[31..0] and the command lines C/BE#[3..0] and is triggered on the rising edge of SubDecode.

Figure 2:
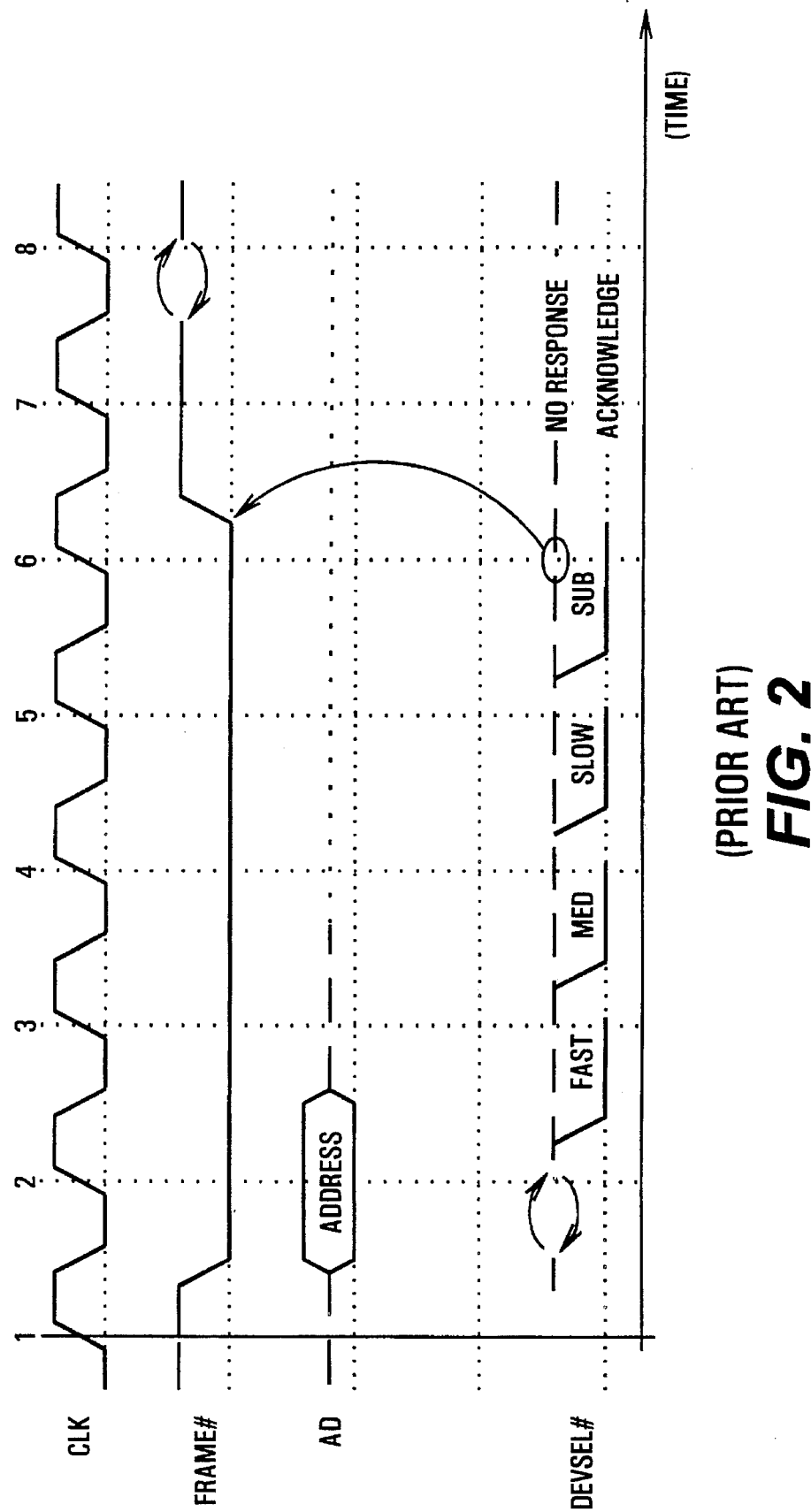
FIG. 2 shows a timing diagram of positive and subtractive decoding at the start of a PCI transaction.

Whenever a true subtractive decode occurs, the counter 26 asserts SubDecode as true, and on the rising edge of that signal the register 30 stores the values of the address and command lines. If, when FRAME is asserted, the AD[31..00] and C/BE#[3..0] lines equal ADR[31..00] and CR[3..0], this address-command combination was previously subtractively decoded, and thus no other PCI positive decode device will be claiming this transaction. So the comparator 28 asserts Match, which then causes the output of the OR gate 32 to go high, driving the bridge interface 24 Hit input true. The bridge interface 24 then immediately asserts DEVSEL# line to true after the second CLK cycle, as does the "fast" positive decode of FIG. 2.

The register 30 stores the values of AD[31..00] and C/BE#[3..0] whenever a normal subtractive decode occurs. That is, when the counter 26 asserts as true the SubDecode signal, this signal triggers the register 30, which is typically a series of D-type rising edge triggered flip-flops, and the register 30 stores the address and command from the PCI bus 12. The next time FRAME goes true, the comparator 28 compares those registered signals with the current address and command, and asserts Match true if equal. The bridge interface 24 then immediately asserts DEVSEL# low.

In discussing the address period of a transaction, it is apparent that to uniquely select a PCI device, more than the address as encoded on AD[31..00] is required; to uniquely select a device, the command on the command lines C/BE#[3..0] is also required. This is because the command on the command lines selects between I/O and memory and between reads and writes. And typically, the device selected by a particular address using a memory read will be different from the device selected by a particular address using an I/O read. Similarly, reads and writes need not occur with the same device, even given the same address and the same type of transaction (memory versus I/O). Thus, a match is required between the stored and current command as well as address for the EISA bridge 10 according to the invention to positively decode a certain address-command combination.

But further, while the address on the address lines AD[31..00] must generally score an exact match, the command could conceivably be cached in a less specific fashion. That is, instead of requiring an exact match between all four lines of C/BE#[3..0], the register 30 and the comparator 28 could include logic that simply stores and compares the types of transactions. That is, any command that performs, for example, a memory read would match any other command that performs a memory read. The same would hold true for memory writes, I/O reads, and I/O writes. This is important in PCI because there is more than one command for memory reads and memory writes. Conceivably, the same could hold true for I/O reads and I/O writes. Thus, the phrase "storing the command lines" more accurately means as "storing the transaction type."

The general requirement for any generic subtractive decode device on any subtractive decoding bus becomes that the register store the lines or logical combination of lines of the bus that will uniquely decode a particular device. In PCI, this is the address lines AD[31..00] plus the command type indicated on the command lines C/BE#[3..0].

While PCI has been used as an example of a local bus on which this registered subtractive decode device could be used, a device according to the invention would not be limited to the PCI local bus, or in fact to a local bus at all. Wherever subtractive decoding is used to address a device, a caching of address-command types could be used to improve the speed of the subtractive decoding on subsequent transactions. This would be obvious to any practitioner skilled in designing bus systems.

Cached Address and Control Lines

Figure 4:
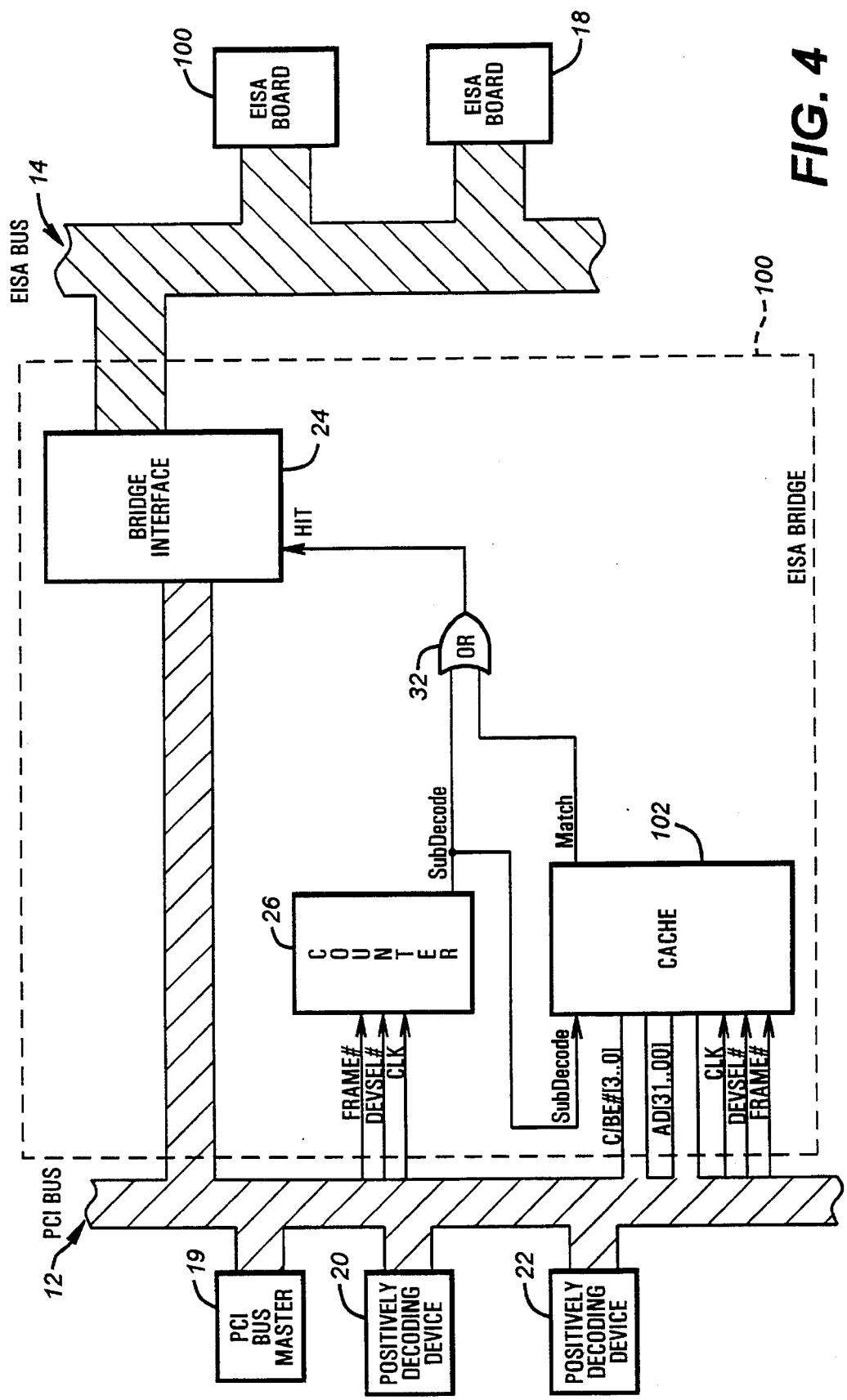
FIG. 4 shows a subtractive decode device according to the invention that uses a cache to store a number of previously subtractively decoded address and command combinations for subsequent positive decoding.

FIG. 4 shows a cached EISA bridge 100. This is similar to the EISA bridge 10 of FIG. 2, but while the EISA bridge 10 can only store one address-command combination in its register, the cached EISA bridge 100 includes an address cache 102 in place of the comparator 28 and register 30 of FIG. 3 allowing it to store multiple address-command combinations. The address cache 102 is similar to normal cache technology except that no data is stored in the cache. The address cache 102 simply stores address-command combinations, and when the address-command lines match an address-command entry in the address cache 102 on a rising edge of CLK after FRAME has just gone low, the address cache asserts Match.

Similar to the EISA bridge 10, when SubDecode goes low, the address cache 102 stores the currently asserted address-command lines. This storage would be done using some standard replacement method, such as least-recently-used. Whenever a cache hit occurs, that entry in the address cache 102 would be made the most recently used.

Again, a match of the command lines C/BE#[3..0] would not necessarily require a one-to-one match of each line. Instead, the command types asserted could be compared, and if the same, a match would occur. Thus, any memory read command could match any other memory read command. That is, rather than requiring a complete match of an entire command, commands relating to memory and I/O reads and writes would be grouped. The PCI bus commands include a number of memory read signals, such as memory read multiple, memory read line, and normal memory read, and each of these could cause a hit on any other memory read command, for example.

And again, the cached EISA bridge 100, as with the EISA bridge 10, could be implemented on other local bus systems, or other buses in general. It is apparent to one familiar with bus systems that it would improve the performance of subtractive decode no matter what type of bus is used.

Cached Subtractive Decode State Machine

Figure 5:
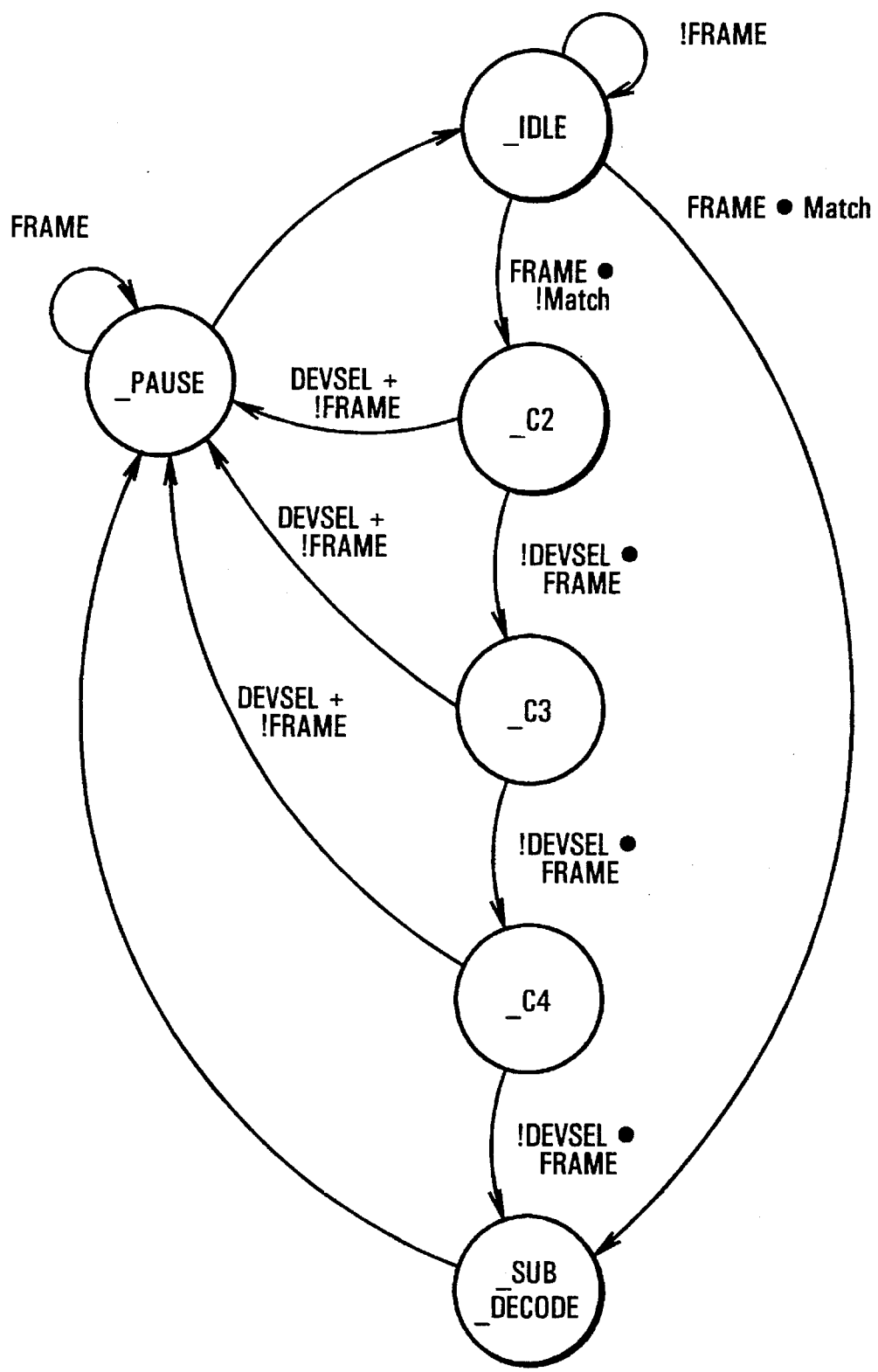
FIG. 5 is a state diagram showing how cached subtractive decode according to the invention would be implemented on PCI.

FIG. 5 shows a state machine as would be implemented in the cached EISA bridge 100 or the EISA bridge 10. The normal, non-FRAME state would be _IDLE. Again, transitions between each state occur on the rising edge of CLK. From the _IDLE state, when FRAME is false, a PCI transaction has not begun, so the routine returns to the _IDLE state.

When FRAME goes true, this indicates a PCI bus master 19 has initiated a transaction. When Match is also false, the routine proceeds to the _C2 state. This indicates that a transaction has started, but the address on the AD[31..00] lines and the command on the C/BE#[3..0] lines do not match either the contents of the register 30 in discussing the EISA bridge 10 or an entry in the address cache 102 in discussing the cached EISA bridge 100. Thus, the state machine has entered a normal subtractive decode attempt.

From state _C2, if DEVSEL is true or FRAME is false, then either the PCI positive decode device 20 or 22 has claimed this transaction or the FRAME has ended. In either case the state machine proceeds to the _PAUSE state. This would be equivalent to the fast speed DEVSEL acknowledgement shown in the prior art of FIG. 2.

If from the _C2 state DEVSEL remains false and FRAME remains true, the routine proceeds to the _C3 state. This indicates another clock cycle has passed without the frame, or transaction, ending and without the PCI positive decode device 20 or 22 having claimed the transaction. From the _C3 state, if DEVSEL goes true or FRAME goes false, the routine proceeds to the PAUSE state. This would be equivalent to the medium speed DEVSEL acknowledgement shown in the prior art of FIG. 2.

If from the _C3 state DEVSEL remains false and FRAME remains true, the routine proceeds to the _C4 state.

From _C4, if DEVSEL is true or FRAME is false, the state machine proceeds to the _PAUSE state. This corresponds to a slow acknowledging device as shown in the prior art of FIG. 2.

If, however, DEVSEL remains false and FRAME remains true, no PCI positive device 20 or 22 has claimed the transaction, so the state machine proceeds to the subtractive decode state, _SUB_DECODE, at which the cached EISA bridge 100 or the EISA bridge 10 asserts the DEVSEL# line by driving it low. This is a subtractive decode, and the cached EISA bridge 100 or the EISA bridge 10 will then have claimed the transaction through subtractive decoding.

From the subtractive decode state _SUB_DECODE, the state machine proceeds to the _PAUSE state, where it remains as long as FRAME is true. This _PAUSE state is needed to wait for the next inter-transaction idle period, indicated when FRAME goes false. At that point, the state machine moves to the _IDLE state to again wait for FRAME to go true, indicating the start of another transaction.

The previously described states are typical of prior art subtractive decode device. The cached subtractive decode device according to the invention, however, adds a shortcut. From the _IDLE state, if FRAME is true and Match is true, then either the cache 102 in discussing the cached EISA bridge 100 or the comparator 28 in discussing the EISA bridge 10 has determined that this address and command combination asserted on AD[31..00] and C/BE#[3..0] match a previously subtractively decoded address-command combination. Thus, the state machine immediately proceeds to the SubDecode state, where the EISA bridge 10 or the cached EISA bridge 100 immediately asserts DEVSEL, as this address and command combination corresponds to this subtractive decode.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A subtractive decoding apparatus for connection to and communication with a bus in a computer system, the bus supporting transactions that can be both positively and subtractively decoded, the bus including lines providing a uniquely decoding address, and the bus including a device select line, said subtractive decoding apparatus comprising:

subtractive decode circuitry for connection to the bus for providing a signal indicating when a current transaction on the bus is not positively decoded;

a register with an input and an output, the input of said register driven by the lines of the bus, said register storing a first uniquely decoding address from the lines of the bus in response to said subtractive decode circuitry indicating that the current transaction on the bus is not positively decoded, and the output of said register providing the stored first uniquely decoding address;

a comparator driven in response to the output of said register, said signal provided by said subtractive decode circuitry, and lines on the bus providing a uniquely decoding address, said comparator further providing a signal indicating a match between the first uniquely decoding address stored in said register and the second uniquely decoding address on the bus lines; and device select circuitry for asserting the device select line in response to either the signal from said subtractive decode circuitry indicating a transaction is not positively decoded or the signal from said comparator indicating a match between the first uniquely decoding address stored in said register and the second uniquely decoding address present on the bus.

2. The apparatus of claim 1, the computer system further including an expansion bus, wherein said subtractive decoding apparatus provides an interface between the bus and the expansion bus.

3. The apparatus of claim 1, the bus being a PCI bus and the computer system further including an EISA bus, wherein said subtractive decoding apparatus provides an interface between the PCI bus and the EISA bus.

4. The apparatus of claim 1, wherein the first and second uniquely decoding addresses include both a command type and an address.

5. A subtractive decoding apparatus for connection to and communication with a bus in a computer system, the bus supporting transactions that can be both positively and subtractively decoded, the bus including lines providing a uniquely decoding address, and the bus including a device select line, said subtractive decoding apparatus comprising:

subtractive decode circuitry for connection to the bus providing a signal indicating when a current transaction on the bus is not positively decoded;

an address cache with an input and an output, the input of said address cache driven by the lines of the bus, said address cache storing a plurality of uniquely decoding addresses from the lines of the bus in response to said subtractive decode circuitry indicating that the current transaction on the bus is not positively decoded, and the output of said address cache providing a signal indicating a match between any of the plurality of stored uniquely decoding addresses and the uniquely decoding addresses currently provided by the lines on the bus; and device select circuitry for asserting the device select line in response to either the signal from said subtractive decode circuitry indicating a transaction is not positively decoded or the signal on the output of said address cache indicating a match between any of the plurality of stored uniquely decoding addresses and the uniquely decoding addresses currently provided by the lines on the bus.

6. The apparatus of claim 5, the computer system further including an expansion bus, wherein said subtractive decoding apparatus provides an interface between the bus and the expansion bus.

7. The apparatus of claim 5, the bus being a PCI bus and the computer system further including an EISA bus, wherein said subtractive decoding apparatus provides an interface between the PCI bus and the EISA bus.

8. The apparatus of claim 5, wherein the uniquely decoding addresses include both a command type and an address.

9. A method for performing positive decode using a subtractive decode apparatus connected to a bus in a computer system, the bus supporting transactions that can be both positively and subtractively decoded, the bus including lines providing a uniquely decoding address, and the bus including a device select line, comprising the steps of:

(a) detecting the start of a first bus transaction;

(b) determining if said first bus transaction is positively decoded;

(c) if not positively decoded, asserting the device select line and storing the uniquely decoding address present on the bus;

(d) waiting for the start of a second bus transaction;

(e) comparing the current uniquely decoding address on the bus during the second bus transaction to the stored uniquely decoding address; and (f) if the stored uniquely decoding address is the same as the current uniquely decoding address, asserting the device select line.

10. The method of claim 9, wherein said step (c) further comprises storing a plurality of uniquely decoding addresses present on the bus, and said step (e) further comprises comparing the current uniquely decoding address on the bus to the plurality of stored uniquely decoding addresses.

11. The method of claim 9, wherein said step (c) further comprises storing said uniquely decoding address in a register.

12. A computer system that provides improved subtractive decoding, said computer system comprising:

a local bus that supports both positively and subtractively decoded transactions, said local bus including address lines;

a processor coupled to said local bus; and a subtractive decode device connected to and communicating with said local bus, said subtractive decode device including:

subtractive decode circuitry connected to said local bus providing a signal indicating when a current transaction on said local bus is not positively decoded;

a register with an input and an output, the input of said register driven by the address lines of said local bus, said register storing a first uniquely decoding address from the address lines of said local bus in response to said subtractive decode circuitry indicating that the current transaction on said local bus is not positively decoded, and the output of said register providing the stored first uniquely decoding address;

a comparator connected to the output of said register, said signal provided by said subtractive decode circuitry, and the address lines on said local bus providing a uniquely decoding address, for comparing a second uniquely decoding address on the address lines to the first uniquely decoding address stored in said register and provided as the output of said register, said comparator further providing a signal indicating a match between the first uniquely decoding address stored in said register and the second uniquely decoding address on said local bus; and device select circuitry for asserting the device select line in response to either the signal from said subtractive decode circuitry indicating a transaction is not positively decoded or the signal from said comparator indicating a match between the first uniquely decoding address stored in said register and the second uniquely decoding address present on said local bus.

13. The computer system of claim 12 further comprising:

an expansion bus; and said subtractive decode device converts transactions between said local bus and said expansion bus.

14. The computer system of claim 13, wherein said local bus is a PCI bus and said expansion bus is an EISA bus.

* * * * *